United States Patent
Wheeler et al.

(10) Patent No.: US 10,697,439 B2
(45) Date of Patent: Jun. 30, 2020

(54) OFFSET TOGGLE METHOD FOR WIND TURBINE OPERATION

(71) Applicant: General Electric Company, Schenectady, NY (US)

(72) Inventors: Frederick Wilson Wheeler, Niskayuna, NY (US); Danian Zheng, Fairfield, CT (US); James Huu Phan, Saratoga Springs, NY (US); Brian Allen Rittenhouse, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 293 days.

(21) Appl. No.: 15/622,317

(22) Filed: Jun. 14, 2017

(65) Prior Publication Data
US 2018/0363632 A1   Dec. 20, 2018

(51) Int. Cl.
| | | |
|---|---|---|
| *F03D 17/00* | (2016.01) | |
| *F03D 7/04* | (2006.01) | |
| *G01M 15/14* | (2006.01) | |

(52) U.S. Cl.
CPC .............. *F03D 17/00* (2016.05); *F03D 7/04* (2013.01); *F03D 7/043* (2013.01); *G01M 15/14* (2013.01);
(Continued)

(58) Field of Classification Search
CPC . F03D 17/00; F03D 7/04; F03D 7/043; F05B 2270/335; F05B 2270/327–329;
(Continued)

(56) References Cited

U.S. PATENT DOCUMENTS

| | | |
|---|---|---|
| 7,571,013 B2 | 8/2009 | Altemark |
| 7,941,304 B2 | 5/2011 | Gundling |

(Continued)

FOREIGN PATENT DOCUMENTS

| | | |
|---|---|---|
| EP | 1 736 664 A1 | 12/2006 |
| WO | WO2013152776 A1 | 10/2013 |
| WO | 2017/088877 A1 | 6/2017 |

OTHER PUBLICATIONS

U.S. Appl. No. 14/198,641, filed Mar. 6, 2014.
(Continued)

*Primary Examiner* — Toan M Le
(74) *Attorney, Agent, or Firm* — Dority & Manning, P.A.

(57) ABSTRACT

A method for evaluating performance of a wind turbine includes operating the wind turbine in a first operational mode. The method also includes generating a first set of operational data relating to the first operational mode. More specifically, the first set of operational data includes, at least, a first parameter and a second parameter. Further, the first and second parameters of the first set are measured during different time periods during the first operational mode. The method further includes changing the first operational mode to a second operational mode. Moreover, the method includes generating a second set of operational data relating to the second operational mode. The second set of operational data also includes, at least, a first parameter and a second parameter. Thus, the method includes determining a performance characteristic of the first and second operational modes based on the first and second sets of operational data.

13 Claims, 7 Drawing Sheets

(52) U.S. Cl.
CPC ....... *F05B 2230/80* (2013.01); *F05B 2260/83* (2013.01); *F05B 2270/20* (2013.01); *F05B 2270/32* (2013.01); *F05B 2270/327* (2013.01); *F05B 2270/328* (2013.01); *F05B 2270/329* (2013.01); *F05B 2270/335* (2013.01)

(58) Field of Classification Search
CPC .............. F05B 2270/32; F05B 2270/20; F05B 2230/80
See application file for complete search history.

(56) References Cited

U.S. PATENT DOCUMENTS

| | | | |
|---|---|---|---|
| 7,987,067 | B2 | 7/2011 | Harrison et al. |
| 8,050,899 | B2 | 11/2011 | Gignuere et al. |
| 8,212,373 | B2 | 7/2012 | Wittekind et al. |
| 8,295,987 | B2 | 10/2012 | Gadre et al. |
| 8,523,520 | B2 | 9/2013 | Nagasaki |
| 8,577,509 | B2 | 11/2013 | Ong et al. |
| 8,604,633 | B2 | 12/2013 | Llombart Estopinan et al. |
| 8,803,351 | B2 | 8/2014 | Dalsgaard et al. |
| 9,097,236 | B2 | 8/2015 | Zhou et al. |
| 2009/0192868 | A1 | 7/2009 | Rajiv et al. |
| 2010/0111693 | A1 | 5/2010 | Wilson |
| 2010/0135795 | A1* | 6/2010 | Nies .................. F03D 7/042 416/1 |
| 2010/0274400 | A1 | 10/2010 | Ormel et al. |
| 2010/0274401 | A1 | 10/2010 | Kjaer et al. |
| 2010/0332373 | A1 | 12/2010 | Crabtree et al. |
| 2011/0309621 | A1 | 12/2011 | Nielsen et al. |
| 2012/0053983 | A1 | 3/2012 | Vidal et al. |
| 2013/0166082 | A1 | 6/2013 | Ambekar et al. |
| 2013/0184838 | A1 | 7/2013 | Tchoryk, Jr. et al. |
| 2015/0147175 | A1 | 5/2015 | Stoltenjohannes et al. |
| 2015/0219074 | A1 | 8/2015 | Babazadeh et al. |
| 2015/0247953 | A1 | 9/2015 | O'Brien et al. |
| 2016/0265513 | A1 | 9/2016 | Evans et al. |
| 2016/0298607 | A1 | 10/2016 | Gregg et al. |

OTHER PUBLICATIONS

U.S. Appl. No. 15/151,573, filed May 11, 2016.
Milan et al.. "The Stochastic Power Curve Analysis of Wind Turbines". pp. 1-26, Dec. 31, 2008.
Sainz et al., "Robust Filtering for the Characterization of Wind Turbines: Improving its Operation and Maintenance", Energy Conversion and Management, vol. No. 50, Issue No. 9, pp. 2136-2147, Sep. 1, 2009.
Kusiak et al., "Dynamic Control of Wind Turbines", Renewable Energy, vol. No. 35, Issue No. 2, pp. 456-463, Feb. 1, 2010.
Hawkins et al., "Maximization of Power Capture in Wind Turbines Using Robust Estimation and Lyapunov Extremum Seeking Control", Dec. 31, 2010.
Mathew et al., "Analysis of Wind Regimes and Performance of Wind Turbines", Microbial Degradation of Xenobiotics, pp. 71-83, Jan. 1, 2011.
Gray, "Efficient Wind Farm Performance Analysis & Optimisation Contents", Uptime Engineering, Nov. 30, 2012.
Paiva et al., "Determining Wind Turbine Power Curves Based on Operating Conditions", Wind Energy, vol. No. 17, Issue No. 10, pp. 1563-1575, Dec. 31, 2013.
Extended European Search Report and Opinion issued in connection with corresponding EP Application No. 18176763.3 dated Oct. 17, 2018.

* cited by examiner

OFFSET TOGGLE METHOD FOR WIND TURBINE OPERATION

FIELD

The present invention relates generally to wind turbines, and more particularly, to offset toggle methods for wind turbine operation for evaluating performance of the turbine in different operational modes.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid. Such configurations may also include power converters that convert a frequency of generated electric power to a frequency substantially similar to a utility grid frequency.

Traditionally, wind turbines include a control module, which attempts to maximize power output of the turbine in the face of varying wind and grid conditions, while satisfying constraints like sub-system ratings and component loads. Based on a determined maximum power output, the control module controls operation of various turbine components, such as the generator/power converter, the pitch system, the brakes, and the yaw mechanism to reach the maximum power efficiency.

The performance of a wind turbine, in terms of annual energy production (AEP), can be improved through control changes and/or various products, features, and/or upgrades available for wind turbines. One or more benefits of a control change and/or an upgrade is typically determined using a toggle method. For example, for upgrade benefit verification, the turbine is operated at a baseline operational state (i.e. without the upgrade) and the operated at an upgraded operational state (i.e. with the upgrade). For control parameter changes, the control parameters are toggled through a repeating sequence of control parameter states. Each state represents a set of control system parameters or settings, which affect turbine operation. During the toggle test, wind speed and power production measurements are recorded. The wind speed and power data collected during each state is used to assess the turbine performance during that state. Typically, the wind speed is measured using the turbine nacelle anemometer, which is generally mounted on the nacelle behind the rotor but may be located at any suitable uptower location. Performance values for each state may then be computed and compared. As such, the comparison can be used to validate a performance gain or to select a state which provides a higher performance.

The nacelle anemometer approach, however, is sometimes hindered due to imprecision of nacelle anemometer measurements and the projection of these measurements into AEP estimates. In addition, the nacelle anemometer does not directly measure the desired free stream wind speed at the turbine because of the aerodynamic effects of the turbine. The relationship between the wind speed at the nacelle anemometer and the free stream wind speed, during turbine operation, is referred to as the nacelle transfer function ("NTF"). The NTF is determined and stored by the turbine controller and is used internally by the wind turbine to correct the wind speed measured by the nacelle anemometer to calculate the free stream wind speed.

However, toggle tests that use the nacelle anemometer to measure wind speed may also change the NTF. An NTF change creates a wind speed measurement bias that is different for the different operational states or modes. With conventional toggle tests and analysis, such bias in turn biases the determined or measured turbine performance in an unknown or unpredictable way.

As such, the present disclosure is directed to an improved system and method for validating a benefit of an upgrade provided to a wind turbine that addresses the aforementioned issues. More specifically, the present disclosure is directed to offset toggle methods for wind turbine operation that accurately and efficiently validate various upgrades provided to the wind turbine.

BRIEF DESCRIPTION

Aspects and advantages of the invention will be set forth in part in the following description, or may be obvious from the description, or may be learned through practice of the invention.

In one aspect, the present subject matter is directed to a method for evaluating performance of a wind turbine in different operational modes. The method includes operating the wind turbine in a first operational mode. The method also includes generating a first set of operational data relating to the first operational mode. More specifically, the first set of operational data includes, at least, a first parameter and a second parameter. Further, the first and second parameters of the first set are measured during different time periods during the first operational mode. The method further includes changing the first operational mode to a second operational mode. Moreover, the method includes generating a second set of operational data relating to the second operational mode. The second set of operational data also includes, at least, a first parameter and a second parameter. Thus, the method includes determining a performance characteristic of the first and second operational modes based on the first and second sets of operational data.

In one embodiment, the first parameter of the second set may be measured during the first operational mode, whereas the second parameter of the second set may be measured during the second operational mode. More specifically, in certain embodiments, the first parameter of the first set may be measured during a first operational window of the first operational mode, whereas the second parameter of the first set may be measured during a second operational window of the first operational mode. In addition, the first parameter of the second set may be measured during a second operational window of the first operational mode, whereas the second parameter of the second set may be measured during a first operational window of the second operational mode.

In another embodiment, a time lag between the first parameter and the second parameter for each of the first and second operational modes may be fixed and/or constant.

In further embodiments, the first and second parameters may include information regarding at least one of or a combination of the following parameters: power output, generator speed, torque output, grid conditions, pitch angle, tip speed ratio, yaw angle, internal control set points, loading conditions, geographical information, temperature, pressure, weather conditions, strain, environmental noise, wind gusts, wind speed, wind direction, wind acceleration, wind turbulence, wind shear, wind veer, wake, and/or similar, or combinations thereof. For example, in one embodiment, the first parameter of the first and second sets of operational data may include wind speed and the second parameter of the first and second sets of operational data may include power output.

In additional embodiments, the step of determining a performance characteristic of the first and second operational modes based on the first and second sets of operational data may include generating first and second power curves for the first and second operational modes based on the wind speed and power output from respective first and second sets of operational data and comparing the first and second power curves for the first and second operational modes to determine the optimal operational mode.

In several embodiments, the method may further include measuring the wind speed via a nacelle-mounted anemometer for the first and second operational modes.

In particular embodiments, the method may also include filtering the first and second sets of operational data. In addition, the method may include toggling between the first and second operational modes and generating a plurality of first and second data sets during each of the modes.

In yet another embodiment, the method may include implementing a change to the wind turbine before operating the wind turbine in the second operational mode. Such a change, for example, may include changing one or more control parameters of the wind turbine and/or providing at least one upgrade to the wind turbine. For example, in one embodiment, the control parameter(s) may include a generator speed, a torque set point, a pitch angle, a tip speed ratio, a yaw angle, or another other suitable parameter or combinations thereof. In addition, the upgrade(s) may include any one of or a combination of the following: a revised pitch or yaw angle, tip speed ratio, software upgrades, controls upgrades, hardware upgrades, or wake controls, or any other similar upgrade that can be quickly and automatically put into place or removed.

In another aspect, the present subject matter is directed to a system for evaluating performance of a wind turbine in different operational modes. The system includes a processor communicatively coupled to one or more sensors. The processor is configured to perform one or more operations, including but not limited to operating the wind turbine in a baseline operational mode, transitioning from the baseline operational mode to a first operational mode, generating a first set of operational data comprising, at least, a first parameter and a second parameter, the first parameter of the first set being measured during the baseline operational mode and the second parameter of the first set being measured during the first operational mode, transitioning from the first operational mode back to the baseline operational mode, transitioning from the baseline operational mode to a second operational mode, generating a second set of operational data comprising, at least, a first parameter and a second parameter, the first parameter of the second set being measured during the baseline operational mode and the second parameter of the second set being measured during the second operational mode, and determining a performance characteristic of the first and second operational modes based on the first and second sets of operational data.

In one embodiment, the one or more operations may further include toggling back and forth between the baseline operational mode and plurality of subsequent operational modes after the second operational mode, generating a set of operational data for each of the subsequent operational modes comprising, at least, a first parameter and a second parameter, the first parameters of each data set being measured during the baseline operational mode and the second parameters of each data set being measured during the respective operational mode, determining a performance characteristic of the first and second operational modes based on the first and second sets of operational data. It should be understood that the system may further include any of the additional features as described herein.

In yet another aspect, the present subject matter is directed to a method for evaluating performance of a wind turbine in different operational modes. The method includes operating the wind turbine in a first operational mode. Further, the method includes generating a first set of operational data relating to the first operational mode that contains, at least, a first parameter and a second parameter. Moreover, the method includes changing the first operational mode to a second operational mode. In addition, the method includes generating a second set of operational data relating to the second operational mode that also contains, at least, a first parameter and a second parameter. More specifically, the first parameter of the second set is measured during the first operational mode, whereas the second parameter of the second set is measured during the second operational mode. Thus, the method also includes determining a performance characteristic of the first and second operational modes based on the first and second sets of operational data. It should be understood that the method may further include any of the additional steps and/or features as described herein.

These and other features, aspects and advantages of the present invention will become better understood with reference the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
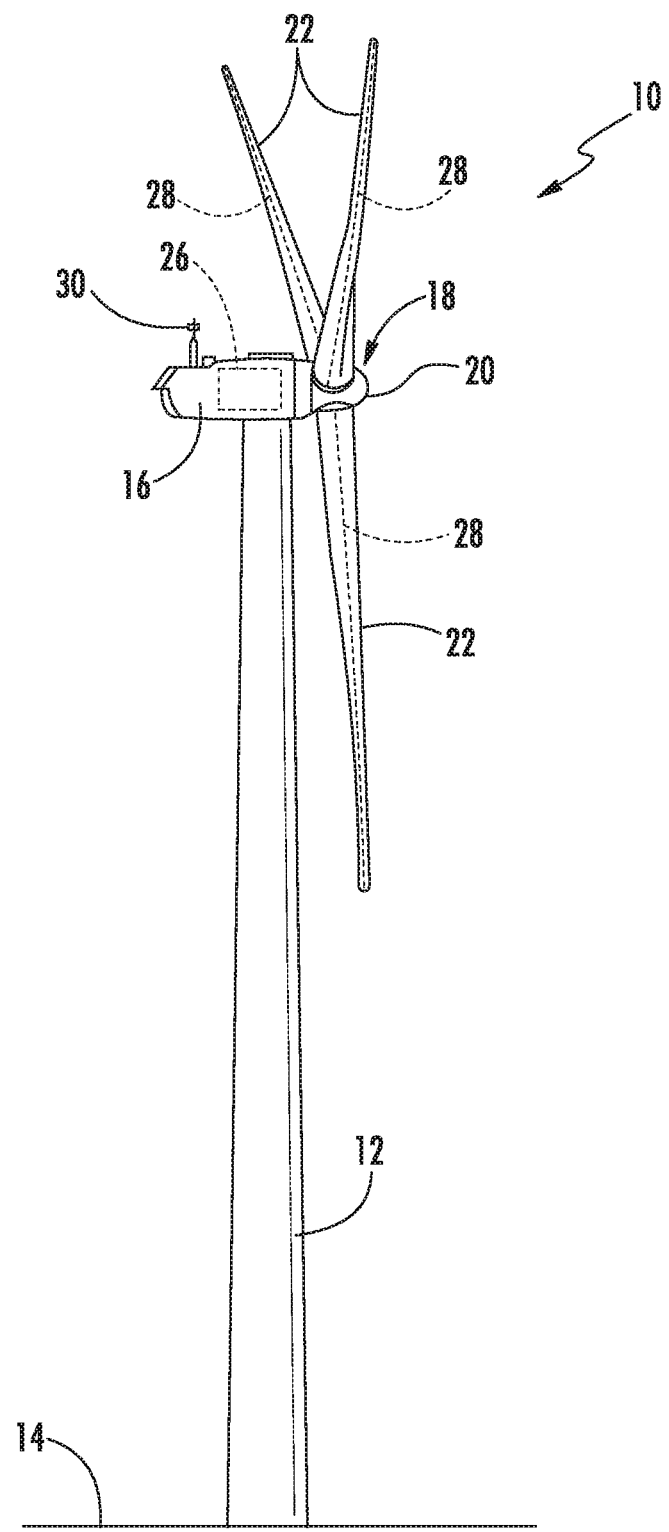
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for evaluating performance of a wind turbine in different operational modes. In one embodiment, for example, the present disclosure is directed to an offset toggle method that utilizes wind speed and power data with a time lag. As used herein, an offset data set is a collection of operating parameters of the wind turbine, such as e.g. wind speed and power measurement pairs. As such, an offset data set is collected for each operational mode. In addition, the offset data sets are created with the following properties: (1) wind speed is measured during the same operational mode for all data sets; (2) power is measured during the operating state under test for each data set, and (3) the time lag between the wind speed measurement and the power measurement is fixed and constant. Once the offset data sets are collected, a processor (either at a farm-level or a turbine-level) processes the data sets to determine turbine performance for each mode. For example, in certain embodiments, the collected data may be filtered, data points directly after a mode transition may be removed, and/or power curves and annual energy production (AEP) may be calculated.

The various embodiments of the system and method described herein provide numerous advantages not present in the prior art. For example, the present disclosure enables the determination of turbine performance for multiple control states using the nacelle anemometer without the possibility of bias due to a change of NTF as the control states change. In addition, the control method of the present disclosure enables the use of existing toggle test data to carry out performance gain determination, which saves validation time.

Referring now to the drawings, FIG. 1 illustrates a perspective view of one embodiment of a wind turbine 10 configured to implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes of the wind turbine 10 (e.g., start-up or shut-down sequences), de-rate or up-rate the wind turbine 10, and/or control various components of the wind turbine 10. For example, the controller 26 may be configured to control the blade pitch or pitch angle of each of the rotor blades 22 (i.e., an angle that determines a perspective of the rotor blades 22 with respect to the direction of the wind) to control the power output generated by the wind turbine 10 by adjusting an angular position of at least one rotor blade 22 relative to the wind. For instance, the controller 26 may control the pitch angle of the rotor blades 22 by rotating the rotor blades 22 about a pitch axis 28, either individually or simultaneously, by transmitting suitable control signals to a pitch drive or pitch adjustment mechanism (not shown) of the wind turbine 10.

Figure 2:
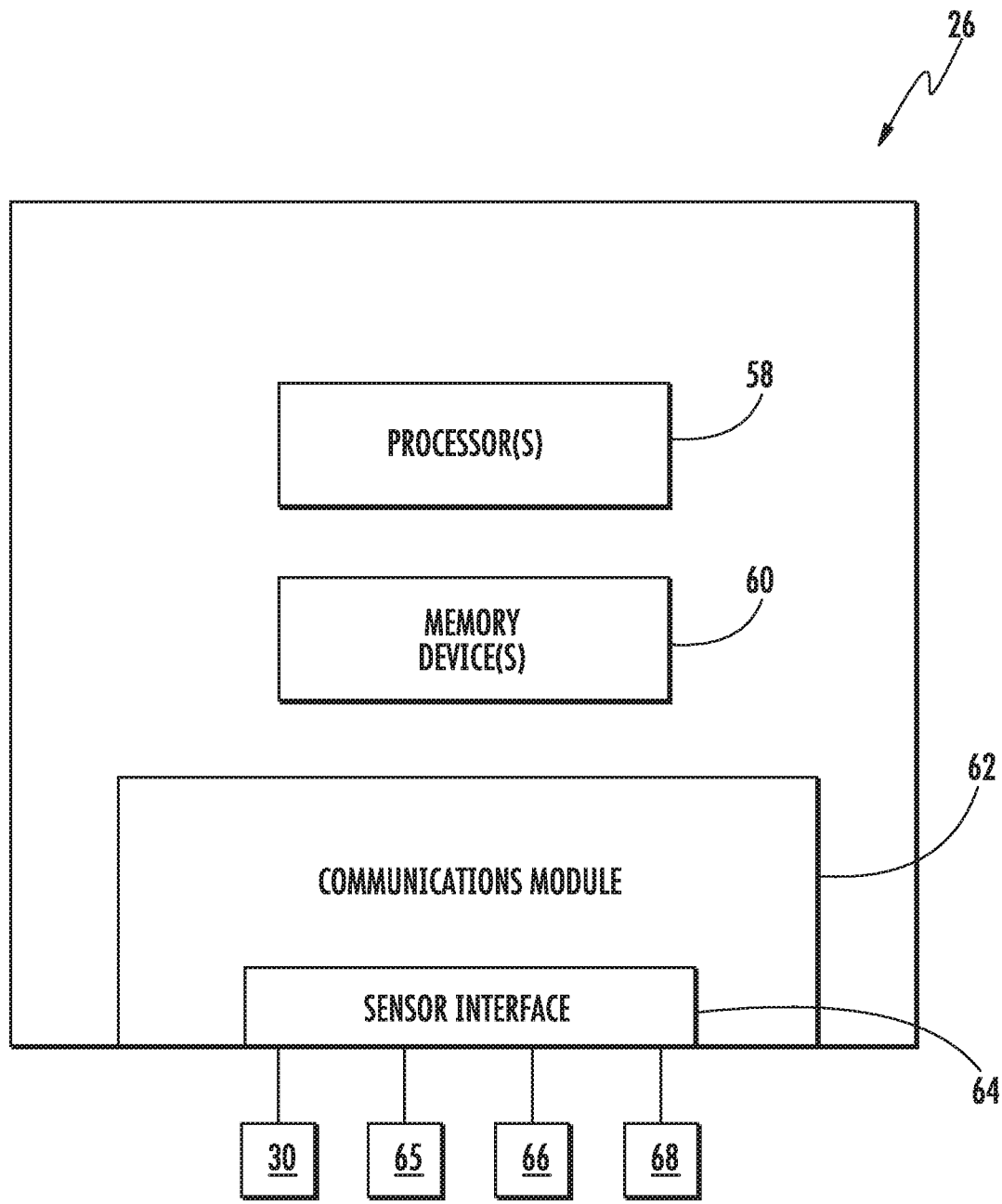
FIG. 2 illustrates a schematic view of one embodiment of a controller for use with the wind turbine shown in FIG. 1.

Referring now to FIG. 2, a block diagram of one embodiment of suitable components that may be included within the controller 26 is illustrated in accordance with aspects of the present disclosure. As shown, the controller 26 may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, application-specific processors, digital signal processors (DSPs), Application Specific Integrated Circuits (ASICs), Field Programmable Gate Arrays (FPGAs), and/or any other programmable circuits. Further, the memory device(s) 60 may generally include memory element(s) including, but are not limited to, computer readable medium (e.g., random access memory (RAM)), computer readable non-volatile medium (e.g., a flash memory), one or more hard disk drives, a floppy disk, a compact disc-read only memory (CD-ROM), compact disk-read/write (CD-R/W) drives, a magneto-optical disk (MOD), a digital versatile disc (DVD), flash drives, optical drives, solid-state storage devices, and/or other suitable memory elements.

Additionally, the controller 26 may also include a communications module 62 to facilitate communications between the controller 26 and the various components of the wind turbine 10. For instance, the communications module 62 may include a sensor interface 64 (e.g., one or more analog-to-digital converters) to permit the signals transmitted by one or more sensors 30, 65, 66, 68 to be converted into signals that can be understood and processed by the controller 26. Furthermore, it should be appreciated that the sensors 30, 65, 66, 68 may be communicatively coupled to the communications module 62 using any suitable means. For example, as shown in FIG. 2, the sensors 30, 65, 66, 68 are coupled to the sensor interface 64 via a wired connection. However, in alternative embodiments, the sensors 30, 65, 66, 68 may be coupled to the sensor interface 64 via a wireless connection, such as by using any suitable wireless communications protocol known in the art. For example, the communications module 62 may include the Internet, a local area network (LAN), wireless local area networks (WLAN), wide area networks (WAN) such as Worldwide Interoperability for Microwave Access (WiMax) networks, satellite networks, cellular networks, sensor networks, ad hoc networks, and/or short-range networks. As such, the processor 58 may be configured to receive one or more signals directly from the sensors 30, 65, 66, 68. In additional embodiments, the processor 58 may also receive one or more signals from subsystems of the wind turbine 10 containing further sensors.

The sensors 30, 65, 66, 68 may be any suitable sensors configured to measure any operational data of the wind turbine 10 and/or wind parameters of the wind farm 200. For example, the sensors 30, 65, 66, 68 may include blade sensors for measuring a pitch angle of one of the rotor blades 22 or for measuring a loading acting on one of the rotor blades 22; generator sensors for monitoring the generator (e.g. torque, rotational speed, acceleration and/or the power output); and/or various wind sensors for measuring various wind parameters (e.g. wind speed, wind direction, etc.). Further, the sensors 30, 65, 66, 68 may be located near the ground of the wind turbine 10, on the nacelle 16, on a meteorological mast of the wind turbine 10, or any other location in the wind farm.

It should also be understood that any other number or type of sensors may be employed and at any location. For example, the sensors may be accelerometers, pressure sensors, strain gauges, angle of attack sensors, vibration sensors, MIMU sensors, camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors. It should be appreciated that, as used herein, the term "monitor" and variations thereof indicates that the various sensors of the wind turbine 10 may be configured to provide a direct measurement of the parameters being monitored or an indirect measurement of such parameters. Thus, the sensors 30, 65, 66, 68 may, for example, be used to generate signals relating to the parameter being monitored, which can then be utilized by the controller 26 to determine the actual condition.

Referring now to FIGS. 3-6, various illustrations are provided to explain the systems and methods of the present disclosure. More specifically, as shown particularly in FIG. 3, a flow diagram of one embodiment of a method 100 for evaluating performance of the wind turbine in different operational modes is illustrated. More specifically, as shown at 102, the method 100 includes operating the wind turbine 10 in a first operational mode 70. For example, in one embodiment, the first operational mode 70 may correspond to a baseline operational mode. As shown at 104, the method 100 may include generating a first set 76 of operational data relating to the first operational mode 70. In one embodiment, the first set 76 of operational data may be generated via one or more of the sensors (e.g. via sensors 30, 65, 66, 68 or any other suitable sensor). Alternatively, the first set 76 of operational data may be estimated via a computer model within the processor 58. More specifically, in certain embodiments, the first set 76 of operational data may include, at least, a first parameter 80 and a second parameter 82. For example, in particular embodiments, the first and second parameters 80, 82 may include information regarding power output, generator speed, torque output, grid conditions, pitch angle, tip speed ratio, yaw angle, internal control set points, loading conditions, geographical information, temperature, pressure, weather conditions, strain, environmental noise, wind gusts, wind speed, wind direction, wind acceleration, wind turbulence, wind shear, wind veer, wake, and/or similar, or combinations thereof. More specifically, in one embodiment, the first parameter 80 may include wind speed and the second parameter 82 may include power output.

Figure 4:
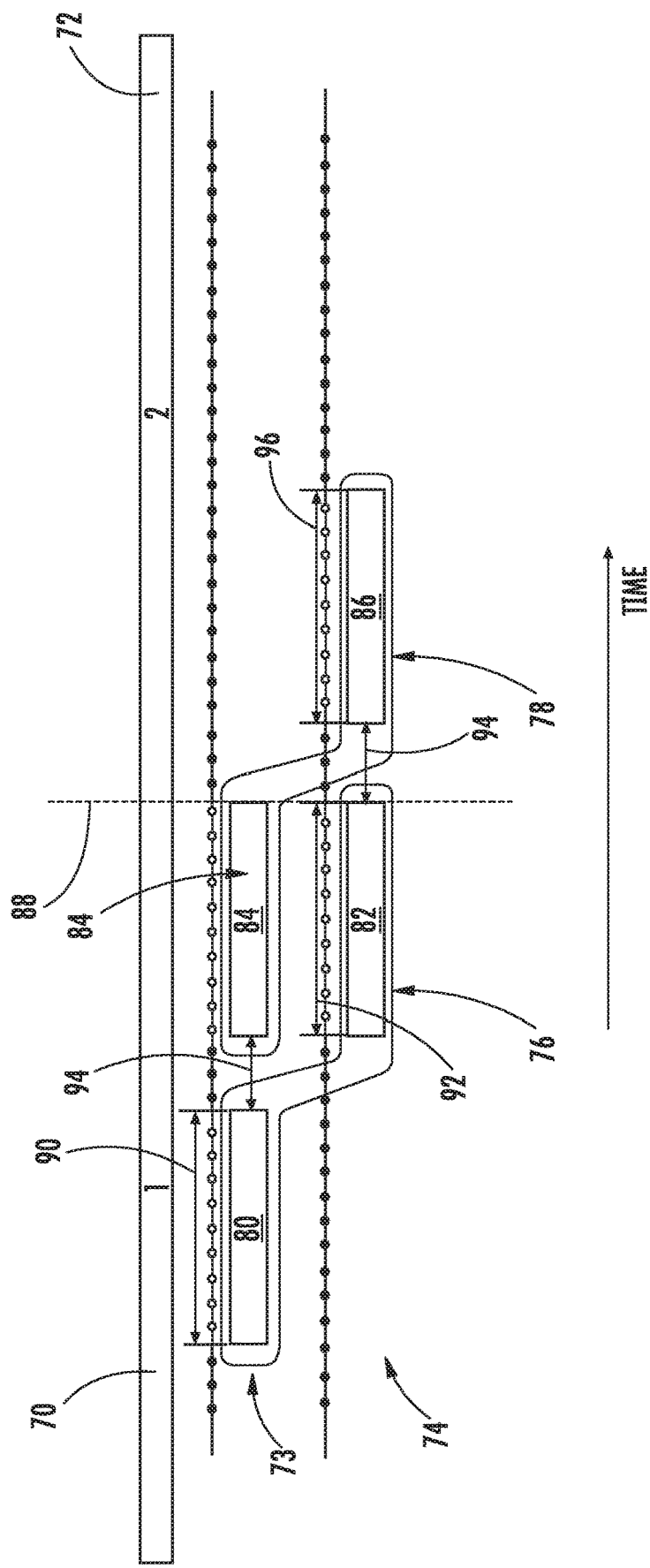
FIG. 4 illustrates a schematic diagram of one embodiment of a method for evaluating performance of a wind turbine by operating in two operational modes.

In addition, the first and second parameters 80, 82 of the first set 76 of operational data are measured during different time periods of the first operational mode 70, i.e. collection of data relating to the first and second parameters 80, 82 is offset. In general, the first parameter is represented by the first row of data 73 and the second parameter is represented by the second row 74 of data ranges. As such, the first and second parameters 80, 82 may be collected at a single instance in time or may be collected over a certain time period (as shown). More specifically, as shown, the first parameter 80 of the first set 76 may be measured during a first operational window 90 of the first operational mode 70, whereas the second parameter 82 of the first set 76 may be measured during a second operational window 92 of the first operational mode 70. Thus, as shown in FIG. 4, the first set 76 of operational data includes the first parameter 80 and the second parameter 82, with the second parameter 82 being collected at a time period different from or offset from the time period at which the first parameter 80 is monitored.

Referring back to FIG. 3, as shown at 106, the method 100 further includes changing the first operational mode 70 to a second operational mode 72. For example, as shown in FIG. 4, the first operational mode is represented by reference character 70 and the second operational mode is represented by reference character 72, whereas the change from the first operational mode 70 to the second operational mode 72 is represented by line 88.

In certain embodiments, a change may be provided to the wind turbine 10 before operating the wind turbine 10 in the second operational mode. For example, such changes may include changing one or more control parameters of the wind turbine 10 and/or providing at least one upgrade to the wind turbine 10. For example, in one embodiment, the control parameter(s) may include a generator speed, a torque set point, a pitch angle, a tip speed ratio, a yaw angle, or another other suitable parameter or combinations thereof. In addition, the upgrade(s) may include any one of or a combination of the following: a revised pitch or yaw angle, tip speed ratio, software upgrades, controls upgrades, hardware upgrades, or wake controls, or any other similar upgrade that can be quickly and automatically put into place or removed.

Figure 3:
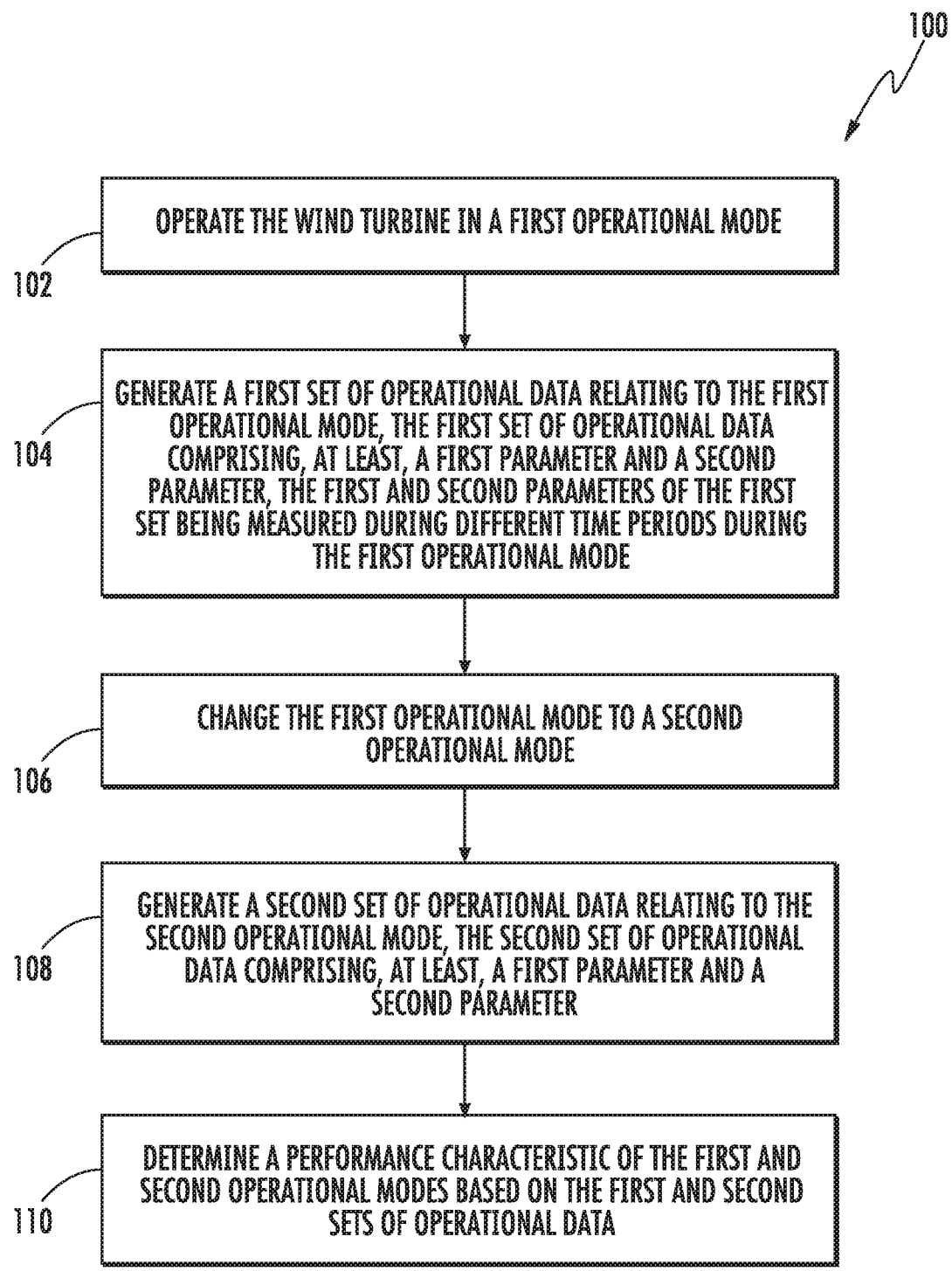
FIG. 3 illustrates a flow diagram of one embodiment of a method for evaluating performance of a wind turbine in different operational modes according to the present disclosure.
Figure 5:
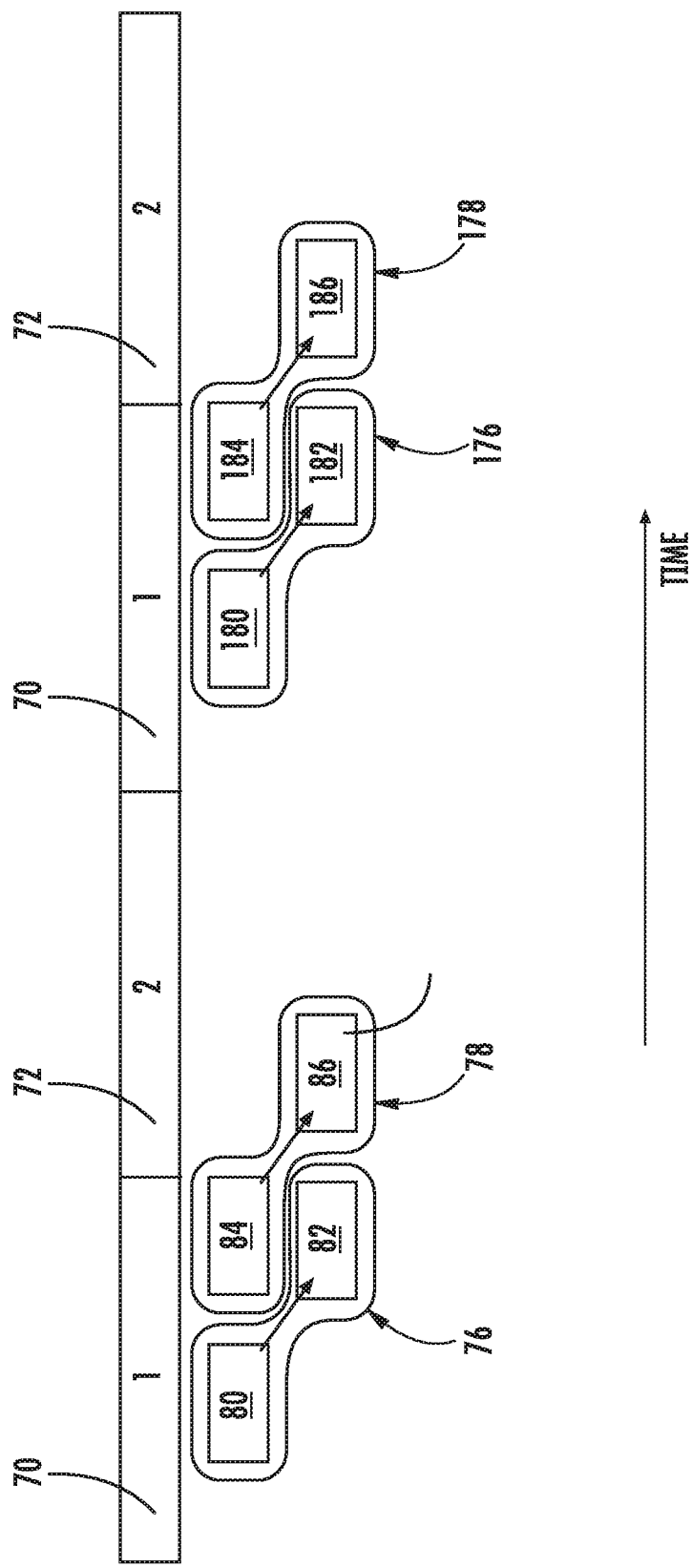
FIG. 5 illustrates a schematic diagram of one embodiment of a method for evaluating performance of a wind turbine by toggling between two operational modes.

Thus, as shown at 108 of FIG. 3, the method 100 includes generating a second set 78 of operational data relating to the second operational mode 72. More specifically, as shown in FIG. 4, the second set 78 of operational data also includes, at least, a first parameter 84 and a second parameter 86. Similar to the first set 76 of operational data, the first and second parameters 84, 86 of the second set 78 of operational data may also be offset (i.e. collected at different instances in time). In further embodiments, as shown in FIG. 5, the controller 26 may also be configured to toggle between the first and second operational modes 70, 72. In such embodiments, the controller 26 may also generate a plurality of first and second data sets 76, 78 during each of the modes 70, 72 for comparison. For example, as shown in FIG. 5, two first data sets 76, 176 and two second data sets 78, 178 are generated and can be compared.

In addition, the second set 78 of operational data may be generated via one or more of the sensors (e.g. via sensors 30, 65, 66, 68 or any other suitable sensor). Alternatively, the second set 78 of operational data may be estimated via a computer model within the processor 58. More specifically, in certain embodiments, the second set 78 of operational data may correspond to the same parameters as the first set 76 of operational data. As such, the first and second parameters 84, 86 of the second set 78 may include information regarding power output, generator speed, torque output, grid conditions, pitch angle, tip speed ratio, yaw angle, internal control set points, loading conditions, geographical information, temperature, pressure, weather conditions, strain, environmental noise, wind gusts, wind speed, wind direction, wind acceleration, wind turbulence, wind shear, wind veer, wake, and/or similar, or combinations thereof. More specifically, in one embodiment, the first parameter 84 may include wind speed and the second parameter 86 may include power output. Thus, in several embodiments, the method 100 may further include measuring the wind speed via a nacelle-mounted anemometer 30 during the first and second operational modes 70, 72. In still alternative embodiments, the first parameters 80, 84 may include wind turbulence or wind shear, whereas the second parameters 82, 86 may include strain or environmental noise.

For example, as shown in FIG. 4, the first parameter 84 of the second set 78 may be measured during the first operational mode 70, whereas the second parameter 86 of the second set 78 may be measured during the second operational mode 72. More specifically, as shown, the first parameter 84 of the second set 78 may be measured during the second operational window 92 of the first operational mode 70, whereas the second parameter 86 of the second set 78 may be measured during a first operational window 96 of the second operational mode 72.

In additional embodiments, the controller 26 may also be configured to filter the first and second sets 76, 78 of operational data. More specifically, in certain embodiments, after the data is collected, it may be filtered to remove data points where the wind turbine 10 was not operating normally, such as when it was deliberately curtailed. In addition, certain data points may be removed or dropped. For example, as shown in FIG. 4, data points directly after a mode transition, i.e. between each operational window 90, 92, and 96, may be dropped. In still further embodiments, data samples may be missing or skipped. In this case, when creating a data set of the first and second parameters, sample pairs can be omitted where either of the samples is missed or skipped.

In another embodiment, a time lag between the first parameter 80, 84 and the second parameter 82, 86 for each of the first and second operational modes 70, 72 may be fixed and/or constant. For example, as shown in FIG. 4, various time lags 94 are illustrated between the different data collection periods. More specifically, as shown, each of the time lags 94 may be the same length. As such, the time lag between the first and second parameters 82, 86 (e.g. the wind speed measurement and power measurement) introduces subtle changes to the data sets that may be characterized as an additional wind speed transfer function or increased measurement noise. In particular embodiments, the time lag is small enough that the wind speed of each measurement pair is sufficiently predictive of the wind speed at the same time of the power measurement. In addition, by being fixed and constant, the effects of the time lag are identical for all data sets for all modes and do not have a negative impact on the performance evaluation process.

In the two-mode example, as shown in FIG. 4, data windows are positioned relative to the transition from the first operational mode 170 to the second operational mode 172. However, in alternative embodiments, the controller 26 may also transition from the second operational mode 172 to the first operational mode 170. Further, performance analysis for such cases may be done separately and combined. Alternatively, data from these two cases may be combined and performance analysis may be done on the larger combined data set.

Figure 6:
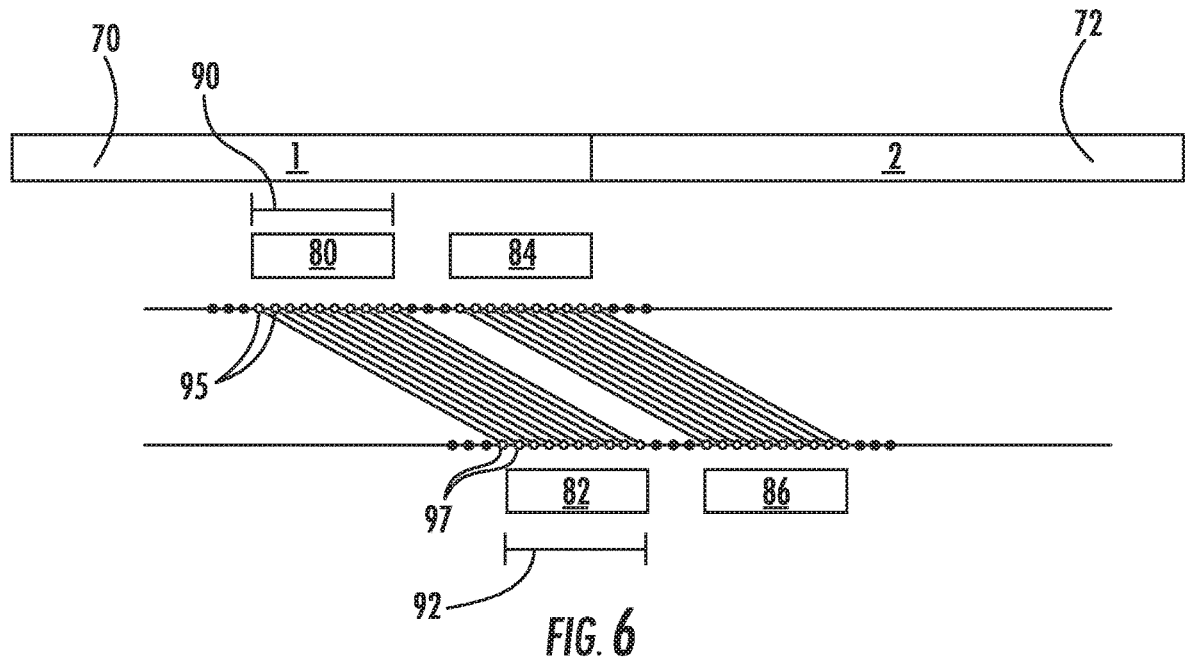
FIG. 6 illustrates a schematic diagram of one embodiment of a method for evaluating performance of a wind turbine by operating in two operational modes, particularly illustrating each data point from a first operational window being paired with a data point from a second operational window that has the same time lag.
Figure 7:
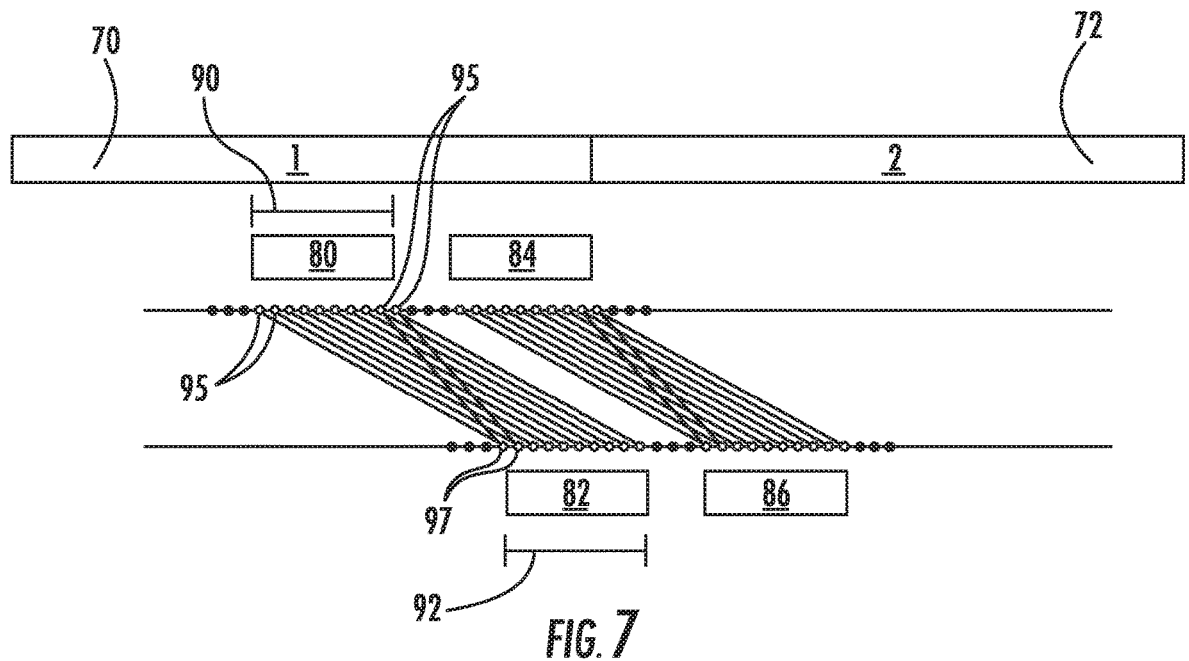
FIG. 7 illustrates a schematic diagram of one embodiment of a method for evaluating performance of a wind turbine by operating in two operational modes, particularly illustrating each data point from a first operational window being paired with one or more data points from a second operational window and vice versa, regardless of time lag.

In certain embodiments, each of the first and second parameters may be used at most once in a data set. Further, such parameters may be paired such that each pair has the same time lag, i.e. the time offset from the first parameter to the second parameter is the same. In further embodiments, however, it is possible to use parameters multiple times and to use pairs with multiple time lags in the same data set. For example, as shown in FIG. 6, each data point 95 from operational window 90 may be paired with a data point 97 from operational window 92 that has the same time lag. In alternative embodiments, as shown in FIG. 7, each data point 95 from operational window 90 may be paired with one or more data points 97 from operational window 92 and vice versa, regardless of time lag. In yet another embodiment, each data point 95 from operational window 90 may be paired with each data point 97 from operational window 92, given that the time lag is within some range.

In addition, as shown in FIG. 5, the controller 26 may toggle between the first and second operational modes 70, 72. The toggling process may be repeated a number of times to ensure that the observed differences between the first and second operational modes 70, 72 are due to the changes in the control settings and/or upgrades and not due to changes in environmental conditions, e.g. wind speed, wind direction, etc. For example, as shown, the controller 26 toggles between the first and second operational modes 70, 72 twice. In further embodiments, the controller 26 may toggle back and forth between the first and second operational modes 70, 72 a plurality of times, e.g. hundreds or thousands of times. By toggling back and forth a number of times, an average performance in the operational modes 70, 72 can be concluded (e.g. the generated power is higher or lower). For example, as shown, the first and second sets 76, 78 of operational data may be combined with additional first and second sets 176, 178 of operational data for the first and second operational modes 70, 72 collected at a subsequent time period. More specifically, as shown, the additional first and second sets 176, 178 of operational data also include first 180, 184 and second 182, 186 parameters, respectively. As such, an optimal operational mode may be chosen and the toggling process may be repeated until a conclusion can be drawn.

The controller 26 is then configured to determine whether the first operational mode 70 is better than the second operational mode 72. More specifically, in one embodiment, the response parameter of first operational mode 70 is compared to the response parameter of the second operational mode 70. For example, referring back to FIG. 3, as shown at 110, the method 100 includes determining a performance characteristic, e.g. such as power, of the first and second operational modes 70, 72 based on the first and second sets 76, 78 of operational data. In addition, the controller 26 can determine a percent power increase expected from the change in the control settings or the upgrade(s) from the first operational mode 70 to the second operational mode 72. More specifically, in certain embodiments, the controller 26 may be configured to generate first and second power curves for the first and second operational modes 70, 72 based on the wind speed and power output from respective first and second sets 76, 78 of operational data and comparing the first and second power curves for the first and second operational modes to determine the optimal operational mode. Once the optimal set points are determined for the various operating parameters, the controller 26 is configured to operate the wind turbine 100 based on the new optimal set points.

Figure 8:
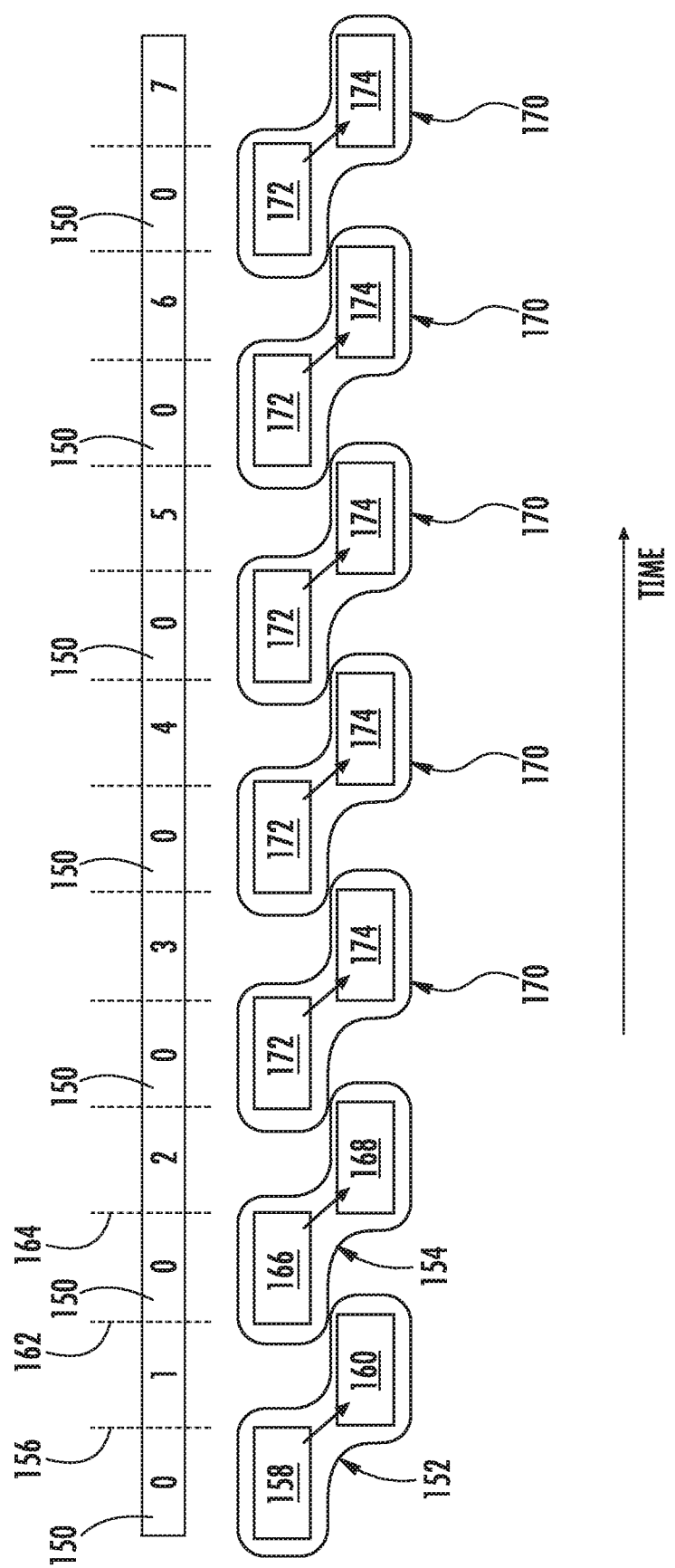
FIG. 8 illustrates a schematic diagram of one embodiment of a method for evaluating performance of a wind turbine by toggling between a baseline operational mode and a plurality of different operational modes.

Referring now to FIG. 8, a schematic diagram of another embodiment for evaluating performance of a wind turbine in different operational modes is illustrated. As shown, the offset toggle method of the embodiment of FIG. 8 includes with more than two operational modes, namely, seven different operational modes (denoted as modes 1, 2, 3, 4, 5, 6, and 7). It should be understood that although seven operational modes are illustrated in FIG. 8, any number of modes including more than seven or less than seven operational modes may be utilized.

In addition, as shown, a baseline operational mode 150, denoted as mode 0, is selected. In certain embodiments, the control parameters for the baseline operational mode 150 may be selected to provide reliable wind speed measurements at the anemometer 30, or may be the baseline or standard parameters for the wind turbine 10. As shown at 156, the controller 26 is configured to transition from the baseline operational mode 150 to a first operational mode (denoted as mode 1). Further, the controller 26 is configured to generate a first set 152 of operational data including, at least, a first parameter 158 and a second parameter 160. More specifically, as shown, the first parameter 158 of the first set 152 is measured during the baseline operational mode 150, whereas the second parameter 160 of the first set 152 is measured during the first operational mode.

As shown at 162, the controller 26 then transitions from the first operational mode back to the baseline operational mode 150. Further, as shown at 164, the controller 26 then transitions from the baseline operational mode to a second operational mode (denoted as mode 2). As such, the controller 26 is configured to generate a second set 154 of operational data which also contains, at least, a first parameter 166 and a second parameter 168. More specifically, as shown, the first parameter 166 of the second set 154 is measured during the baseline operational mode 150, whereas the second parameter 168 of the second set 154 is measured during the second operational mode. Thus, the controller 26 may then compare the first and second sets 152, 154 of operational data to determine an optimal operational mode.

In addition, the controller 26 may toggle back and forth between the baseline operational mode 150 and plurality of subsequent operational modes after the second operational mode. For example, as shown in FIG. 8, the controller 26 may proceed to operate the wind turbine 10 through additional modes after the second operational mode (i.e. modes 3, 4, 5, 6, and 7). However, as shown, in between each of the modes, the controller 26 reverts back to the baseline operational mode 150. The progression through the modes may be randomized, though the baseline operational mode 150 is still inserted between all of the modes.

As such, the controller 26 may also generate additional sets 170 of operational data for each of the subsequent operational modes. Such data sets may also include a first parameter 172 and a second parameter 174. More specifically, as mentioned, the first parameters 172 of each data set 170 may be measured during the baseline operational mode 150, whereas the second parameters 174 of each data set 170 may be measured during the respective operational mode. Further, as shown, the data set 170 for each of the modes may be collected using operational windows relative to the transition from the baseline operational mode 150 to each of the respective modes. In such embodiments, the controller 26 may then compare the plurality of data sets 152, 154, 170 of operational data to determine an optimal operational mode. In other words, turbine performance is carried out for all data sets to compare performance between the modes.

It should be understood that though FIG. 8 refers to the additional sets 170 of operational data (with first and second parameters 172 and 174) as having the same reference numbers, such notations are provided for simplification purposes only. In other words, it should be understood that the first and second parameters 172, 174 of each of the additional operational sets 170 may be the same or different values.

It should be understood that though the offset toggle method has been described with the time lag such that wind speed is measured before power, the present disclosure also covers the reverse process (i.e. power is measured before wind speed or any other combination of parameters). In addition, though the present disclosure has been described in terms of fixed operational modes (i.e. the control parameters values for a mode do not change), the present disclosure may also include changing the control parameters for a mode over time or during a test.

Any suitable toggle period may be utilized for toggling between the different modes. As used herein, the toggle period generally refers to the time spent in each mode before transitioning to a different mode. Thus, the toggle period may be constant or different. The toggle period may also be randomized. For example, in one embodiment of a randomized toggle period, the toggle period may be 14 or 15 samples, selected randomly every time there is a mode transition. In addition, the toggle period should be selected such that the overall mode sequence cycle does not align with another turbine cycle, weather condition cycle, or daily cycle that may affect the performance in a mode.

In certain embodiments, to avoid alignment with a daily cycle, an extra mode may be added to the mode sequence. For example, for 20-minute toggle periods and a nine-mode sequence (represented by 0, 1, 0, 2, 0, 3, 0, 4, 0, 5, 0, 6, 0, 7, 0, 8, 0, 9), the mode sequence would take six hours to complete (e.g. 20 minutes multiplied by 18). Repeating this mode sequence would cause the modes to align with a daily cycle. Thus, at least one additional state may be added to avoid such alignment. For example, by adding a single baseline mode, the mode sequence results in 0, 1, 0, 2, 0, 3, 0, 4, 0, 5, 0, 6, 0, 7, 0, 8, 0, 9, 0. Therefore, the 6-hour-and-20-minute sequence does not align with the daily cycle.

In addition, thus far, the present disclosure has been described in terms of fixed sample intervals. For example, the first and second parameters may be collected every 30 seconds. It should be understood, however, that the present disclosure may also include irregular data sampling intervals. With irregular data sampling intervals, data sets of corresponding parameters may be created based on time differences between samples matching a desired time lag, instead of a fixed number of sample intervals. Data interpolation may be used to determine data values between sample points.

Exemplary embodiments of a wind turbine, a controller for a wind turbine, and a method for optimizing wind turbine operation are described above in detail. The method, wind turbine, and controller are not limited to the specific embodiments described herein, but rather, components of the wind turbine and/or the controller and/or steps of the method may be utilized independently and separately from other components and/or steps described herein. For example, the controller and method may also be used in combination with other power systems and methods, and are not limited to practice with only the wind turbine system as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for evaluating performance of a wind turbine in different operational modes, the method comprising:
    operating the wind turbine in a first operational mode;
    generating a first set of operational data relating to the first operational mode, the first set of operational data comprising data pairs, each data pair comprising a wind speed measured exclusively at the wind turbine and a measured power output, the first set of operational data being used to determine a first power curve;
    changing the first operational mode to a second operational mode;
    generating a second set of operational data relating to the second operational mode, the second set of operational data comprising data pairs, each data pair comprising a wind speed measured exclusively at the wind turbine and a measured power output, the second set of operational data being used to determine a second power curve, the wind speed of the second set of operational data being measured during the first operational mode and the measured power output of the second set of operational data being measured during the second operational mode such that the wind speed of the first and second sets of operational data are both measured during the first operational mode; and,
    determining a performance characteristic of the first and second operational modes based on the first and second power curves.

2. The method of claim 1, wherein the measured wind speeds and measured power outputs of the first set are measured during different time periods during the first operational mode.

3. The method of claim 2, wherein the wind speed of the first set is measured during a first operational window of the first operational mode, and wherein the measured power output of the first set is measured during a second operational window of the first operational mode, the wind speed of the second set is measured during a second operational window of the first operational mode, and the measured power output of the second set is measured during a first operational window of the second operational mode.

4. The method of claim 3, wherein a time lag between the wind speed and the measured power output for each data pair of the first and second sets of operational data is fixed and constant.

5. The method of claim 1, further comprising comparing the first and second power curves for the first and second operational modes to determine the optimal operational mode.

6. The method of claim 1, further comprising measuring the wind speed from respective first and second sets of operational data via a nacelle-mounted anemometer for the first and second operational modes.

7. The method of claim 1, further comprising filtering the first and second sets of operational data.

8. The method of claim 1, further comprising toggling between the first and second operational modes and generating a plurality of data pairs for each of the first and second operational sets of data.

9. The method of claim 1, further comprising implementing a change to the wind turbine before operating the wind turbine in the second operational mode, wherein the change comprises at least one of changing one or more control parameters of the wind turbine or providing at least one upgrade to the wind turbine.

10. The method of claim 9, wherein the one or more control parameters comprises at least one of a generator speed, a torque set point, a pitch angle, a tip speed ratio, or a yaw angle.

11. The method of claim 9, wherein the at least one upgrade comprises any one of or a combination of the following: a revised pitch or yaw angle, tip speed ratio, software upgrades, controls upgrades, hardware upgrades, or wake controls.

12. A system for evaluating performance of a wind turbine in different operational modes, the system comprising:
    a processor communicatively coupled to one or more sensors, the processor configured to perform one or more operations, the one or more operations comprising:
        operating the wind turbine in a baseline operational mode;
        transitioning from the baseline operational mode to a first operational mode;
        generating a first set of operational data comprising data pairs, each data pair comprising a wind speed measured exclusively at the wind turbine and a measured power output, the first set of operational data being used to determine a first power curve, the wind speed of the first set being measured during the baseline operational mode and the measured power output of the first set being measured during the first operational mode;
        transitioning from the first operational mode back to the baseline operational mode;

transitioning from the baseline operational mode to a second operational mode;

generating a second set of operational data comprising data pairs, each data pair comprising a wind speed measured exclusively at the wind turbine and a measured power output, the second set of operational data being used to determine a second power curve, the wind speed of the second set of operational data being measured during the baseline operational mode and the measured power output of the second set of operational data being measured during the second operational mode such that the wind speed of the first and second sets of operational data are both measured during the first operational mode; and, determining a performance characteristic of the first and second operational modes based on the first and second power curves.

13. The system of claim 12, further comprising:

toggling back and forth between the baseline operational mode and plurality of subsequent operational modes after the second operational mode;

generating a set of operational data for each of the subsequent operational modes comprising, at least, a first parameter and a second parameter, the first parameters of each data set being measured during the baseline operational mode and the second parameters of each data set being measured during the respective operational mode; and, comparing the sets of operational data to determine the optimal operational mode.

* * * * *